United States Patent [19]

Gvozdic et al.

[11] Patent Number: 4,766,191

[45] Date of Patent: Aug. 23, 1988

[54] SILICONE POLYMER TERMINATION

[75] Inventors: Nedeljko V. Gvozdic, Bay City; Terrence K. Hilty; John C. Saam, both of Midland, all of Mich.

[73] Assignee: Dow Corning Corporation, Midland, Mich.

[21] Appl. No.: 71,965

[22] Filed: Jul. 10, 1987

[51] Int. Cl.$^4$ ............................................. C08G 77/06
[52] U.S. Cl. ........................................ 528/14; 528/22; 528/23; 528/37
[58] Field of Search ..................... 528/14, 22, 23, 37

[56] References Cited

U.S. PATENT DOCUMENTS

| | | | |
|---|---|---|---|
| 2,739,952 | 3/1956 | Linville | 260/46.5 |
| 3,153,007 | 10/1964 | Boot | 260/46.5 |
| 4,250,290 | 2/1981 | Petersen | 528/14 |
| 4,439,592 | 3/1984 | Maass et al. | 528/14 |
| 4,551,515 | 11/1985 | Herberg et al. | 528/14 |

Primary Examiner—Melvyn I. Marquis
Attorney, Agent, or Firm—Edward C. Elliott

[57] ABSTRACT

Polydiorganosiloxane gum, of the type produced by the alkaline metal catalyzed polymerization of organocyclosiloxanes can be reduced in hydroxyl content by mixing the gum with an acid or acid producing phosphoric component and a silylamine component, allowing the mixture to react until the hydroxyl groups are lowered to the desired extent, then devolatilizing the gum. The hydroxyl content can be lowered without causing any significant change in the molecular weight of the gum. The hydroxyl content can be lowered to essentially zero.

13 Claims, No Drawings

SILICONE POLYMER TERMINATION

BACKGROUND OF THE INVENTION

1. Field of the Invention

This invention relates to a method of terminating polydiorganopolysiloxane to lessen or eliminate the number of hydroxy groups on silicon in the finished polymer.

2. Background Information

In the process of producing elastomers of polydiorganosiloxane, it becomes necessary to produce the high molecular weight polydiorganosiloxane used as the backbone of the elastomeric composition. The elastomeric composition comprises the polymer, a filler, and a curing system. The exact polymer that is used depends upon the desired physical properties of the final cured elastomeric composition, as well as the curing system chosen. In the instant case, the primary interest is in those polymers which are of a viscosity such that they are commonly referred to as "gums". These polymers are those usually combined with colloidal silica as a reinforcing agent and with organic peroxides as a curing system. The compositions are formed into shape by molding under pressure or by extrusion, then are cured by exposing to an elevated temperature. The cured elastomer has exceptional heat resistance as well as very acceptable physical properties.

A typical polydiorganosiloxane is ordinarily prepared by a batch process as follows: siloxane cyclic monomers, such as octamethylcyclotetrasiloxane, are charged to a polymerization vessel and dried by distillation or by treatment with drying agents. The monomer is then heated as to about 155° C. and sufficient polymerization catalyst, such as potassium hydroxide, is added to give a concentration of about 5 to 50 parts potassium per million parts of monomer. The polymerization is allowed to proceed until the polymer formed has the desired viscosity. The polymerization is stopped by the addition of a neutralizing agent such as an equal molar quantity of acidic material, such as phosphoric acid or carbon dioxide. The crude polymer is then stripped of unreacted monomer by distillation under vacuum. The polymers used in producing heat cured elastomers normally have a viscosity of greater than 1000 Pa.s at 25° C.

The above process is modified to give better control over the final viscosity of the polymer by adding end blocking units to the process during the polymerization process to control the polymer molecular weight. Commonly used end blocking materials are short chain siloxanes having $R_3SiO-$ ends, where R is hydrocarbon radical or hydroxyl radical or mixtures.

When it is desired to make polymers for use with reinforcing colloidal silica, it is often desirable to have as few hydroxyl groups present as possible. Any hydroxyl groups present react upon contact with the colloidal silica to form polymer-filler linkages which act the same as crosslinks, thus creating a higher viscosity, crosslinked mixture which does not flow easily under pressure. The resultant process is known as "creping". The creped material must be broken down by intensive shearing, as on a two roll mill, before it can be further processed. This is an expensive process, which also can effect the physical properties of the resultant cured elastomer. The endblocking materials are ordinarily triorgano endblocked so that the polymer has few hydroxy radicals present. Another method of attempting to prevent some of this problem is the use of "process aids" in the composition. A typical process aid is a low viscosity, hydroxyl endblocked polydiorganosiloxane. The thought is that the low viscosity material will preferentially react with the filler, thus preventing filler reaction with the high viscosity polymer.

In the polymerization process for making high molecular weight polymers, it is thought that hydroxyl groups are formed on a small number of the chain ends. The process of the instant invention is related to replacing these hydroxyl radicals with radicals which do not react with the filler.

Peterson, in U.S. Pat. No. 4,250,290 issued Feb. 10, 1981, teaches a process for the continuous manufacture of diorganopolysiloxane polymers. The process makes use of either water or a triorganosiloxy chainstopper to maintain the efficiency of the static mixer used in the process.

Maass et al, in U.S. Pat. No. 4,439,592, issued Mar. 27, 1984, describe a process for the preparation of triorganosilyl-terminated polydiorganosiloxanes by basic polymerization of cyclic diorganopolysiloxanes and triorganosilyl-terminated siloxanes. Before the polymerization is started, a part of the cyclic diorganosiloxane is distilled off in the presence of the polymerization catalyst to remove as much of the water present in the mixture as possible before the polymerization is started.

Herberg et al., in U.S. Pat. No. 4,551,515, issued Nov. 5, 1985, teaches a process for the continuous polymerization of polydiorganosiloxanes in which cyclopolysiloxane in mixed with one or more chainstopping agents, preheated, catalyzed, polymerized, and neutralized, using a screw extruder. They discuss drying the mixture of tetramer and chainstopping agent by passing through molecular sieves at the beginning of the process to remove water that will otherwise chainstop the polymer with silanol groups. They teach chainstopping agents may be any of those known in the art, such as vinyl chainstopper, trimethylsiloxy chainstopper, or silanol chainstopper.

None of the above processes or methods produces a polymer completely without any hydroxyl groups in the polymer. When only a triorganosilyl endblocked chainstopping agent is used, and the cyclic monomers are dried before use, a polymer can be produced with a minimum amount of hydroxyl group present, but that minimum amount is sufficient to cause a polymer to react with a colloidal silica filler to an extent sufficient to cause creping.

Additional means of producing polydiorganosiloxane having a lower silanol content may be found in U.S. patent application Ser. No. 923,468, filed Oct. 27, 1986, now U.S. Pat. No. 4,719,276 "Neutralization of Catalyst in Polymerization of Polydiorganosiloxane", by Leo Stebleton, owned by the same assignee as the instant application. This invention relates to a method of neutralizing the catalyst used in the alkaline polymerization of polydiorganosiloxane in which the neutralizing agent is a composition of the formula $R'_3SiOC(O)R''$, where R' is a hydrocarbon radical of from 1 to 6 carbon atoms inclusive and R" is a hydrocarbon radical of from 1 to 8 carbon atoms inclusive. Preferred is dimethylvinylsilylacetate.

Polydiorganosiloxane polymers are commonly produced by polymerization of cyclic materials using an alkaline catalyst. The catalyst is neutralized at the end of the polymerization process, with the resulting salt commonly remaining in the polymer in some small amount. When heated to high temperatures, the catalyst is activated and causes the polymer to be degraded. U.S. Pat. No. 2,739,952, issued Mar. 27, 1956, teaches the use of an organophosphorus compound free of silicon-bonded halogen in conjunction with such a polymer to prevent the polymer degradation upon heating. In U.S. Pat. No. 3,153,007, issued Oct. 13, 1964, it is commented that steam causes undesirable side effects during the devolatilization of gums such as are described in U.S. Pat. No. 2,739,952.

SUMMARY OF THE INVENTION

Polydiorganosiloxanes being substantially free of hydroxyl groups on silicon, as well as being heat stable, can be produced by treating polydiorganosiloxane with an acidic or acid producing phosphoric component and a silylamine component. The components can be mixed and introduced into the polymer or can be introduced sequentially.

It is an object of this invention to produce a polydiorganosiloxane gum which is heat stable and which does not bind with fume silica to form a crepe upon aging.

DESCRIPTION OF THE INVENTION

This invention is related to a method of producing a polydiorganosiloxane substantially free of hydroxyl groups comprising, (A) heating 100 parts by weight of polydiorganosiloxane containing alkali metal to a temperature of from room temperature to 160° C., then (B) adding sufficient acidic or acid producing phosphoric component of the formula

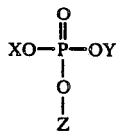

where X, Y, and Z are hydrogen or $SiR_3$, and R is a monovalent hydrocarbon radical or halogenated hydrocarbon radical having 1 to 6 carbon atoms, to give a ratio of alkali metal from the polydiorganosiloxane in (A) to the phosphorus in (B) of from 1:1 to 1:10, and from 0.3 to 3.0 parts by weight of silylamine component of the formula

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms or $R_3Si$— radical, and mixing with the exclusion of atmospheric moisture, then (C) holding at temperature for a sufficient time to allow the removal of the hydroxyl groups, then (D) devolatilizing to remove any volatile products and unreacted ingredients, to yield a polydiorganosiloxane having a slight change in viscosity and a reduced number of hydroxyl groups on silicon.

A typical polydiorganosiloxane useful for the manufacture of silicone rubber is made in the manner described above in the background information. A common method of neutralizing the alkali metal catalyst used for polymerization is the addition of carbon dioxide to the mixture, which forms a salt with the catalyst and stops the polymerization process. Such a gum, when reinforced with fume silica, is a relatively heat stable material of commerce.

If such a gum is heated to an elevated temperature, such as 250° C., without some heat stability additive having been incorporated, the polymer is attacked by the catalyst and reverts back to lower molecular weight species, which volatilize from the material. The polymer will be completely evaporated in a matter of a few hours under such conditions.

Such a typical polydiorganosiloxane is endblocked with triorganosilyl groups, but a small number of the polymer chains are endblocked with hydroxyl groups. These groups can react with the fumed silica used for reinforcement to produce a stiff, unworkable mass, a process commonly known as "creping". The process of this invention reacts with the few remaining hydroxyl groups in the polymer in such a manner that they will no longer react with the fume silica.

The process of this invention can be carried out as a means of stopping the polymerization process and neutralizing the polymerization catalyst during polymerization of polydiorganosiloxane.

The amount of hydroxyl groups remaining in a gum may be estimated in relative terms by measuring the viscosity of the gum as produced, then crosslinking the gum through the hydroxyl groups and again measuring the viscosity. The relative increase in viscosity is a measure of whether there are hydroxyl groups present in the gum. An "activity number" is used to give an indication of the amount of hydroxyl groups present. In the instant case, an activity number of 0 is equivalent to 0 hydroxyl groups present. An activity of 30 is equivalent to about 30 percent of the chain ends being hydroxyl groups. An activity of 250 is equivalent to all of the chain ends being hydroxyl groups.

Polydiorganosiloxane gums are produced by the polymerization of low molecular weight cyclic species. In order to produce high molecular weights, it is necessary that the starting cyclic material be relatively pure, so the common starting ingredient is octaorganocyclotetrasiloxane of the formula

where R is a monovalent substituted or unsubstituted hydrocarbon radical. The cyclic material is polymerized by heating in the absence of moisture with a polymerization catalyst; for example, an alkaline metal compound such as potassium hydroxide in an amount of about 50 parts by weight per million parts by weight of cyclics. After the polymerization has reached the desired level, the catalyst is neutralized, and the mixture is stripped to remove unreacted low molecular weight materials, if desired.

The process of this invention can be followed to neutralize the catalyst after polymerization. After the desired degree of polymerization has taken place, the polymerization catalyst is neutralized by adding sufficient acidic or acid producing phosphoric component of the formula

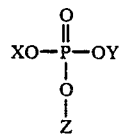

where X, Y, and Z are individually hydrogen or $SiR_3$, and R is a monovalent hydrocarbon radical or halogenated hydrocarbon radical having from 1 to 6 carbon atoms, to give a ratio of alkali metal, from the polydiorganosiloxane polymerization catalyst, to the phosphorus in the above phosphoric component to give a ratio of from 1:1 to 1:10. That is; there must be at least one phosphorus for each alkali metal present in the polydiorganosiloxane. As the amount of phosphoric component is increased, the silanol content of the gum is decreased, using a constant amount of silylamine and a constant reaction time and temperature. A practical amount of phosphoric component is thought to be up to 10 times the amount of alkali metal present, with the preferred amount greater than 4 times the amount of alkali metal present.

R in the above phosphoric component can be a monovalent hydrocarbon radical of from 1 to 6 carbon atoms such as an alkyl radical, such as methyl, ethyl, propyl, or hexyl; an alkenyl radical, such as vinyl or allyl; a halogenated hydrocarbon radical such as a halogenated alkyl, such as chloromethyl or 3,3,3-trifluoropropyl; or an aromatic radical, such as phenyl.

Examples of the phosphoric component are phosphoric acid and tris(trimethylsilyl)phosphate, with phosphoric acid preferred. When phosphoric acid is added as the phosphoric component, it is preferably added as an 85 percent concentration in water. It is preferred that the order of addition in this case be the addition of the silylamine component first, then the addition of the phosphoric acid. If 100 percent phosphoric acid is used, the order of addition is probably unimportant.

From 0.3 to 3.0 parts by weight of silylamine component of the formula

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms or $R_3Si$— radical, is added in the method of this invention.

R in the above silylamine component can be monovalent hydrocarbon radical of from 1 to 6 carbon atoms such as an alkyl radical, such as methyl, ethyl, propyl, or hexyl; an alkenyl radical, such as vinyl or allyl; a halogenated hydrocarbon radical such as a halogenated alkyl, such as chloromethyl or 3,3,3-trifluoropropyl; or an aromatic radical, such as phenyl.

R' and R" in the above silylamine component can be monovalent hydrocarbon radical of from 1 to 6 carbon atoms such as an alkyl radical, such as methyl, ethyl, propyl, or hexyl: an alkenyl radical, such as allyl; an aromatic radical, such as phenyl; or $R_3Si$— radical.

Silylamines are such as hexamethyldisilazane, and bis[3,3,3-trifluoropropyl(dimethyl)silyl]amine, with hexamethyldisilazane preferred.

Preferably, the silylamine is added to the polydiorganosiloxane before the phosphoric acid component is added. It is considered that the silylamine needs to be mixed into the polymer so that it is available to react with the hydroxyl groups on silicon when the reaction is catalyzed by the addition of the phosphoric component. When this order is used, the silylamine is also present to react with the water present in the phosphoric component when phosphoric acid is used. The water is thus prevented from reacting with the polydiorganosiloxane to produce additional OH groups, rather than eliminating OH groups as is desired. The concentration of the silylamine has an effect upon the rate of removal of the hydroxyl groups on silicon, the higher the concentration, the faster the groups disappear. The preferred silylamine is hexamethyldisilazane. The preferred concentration is from 0.3 to 1.0 parts by weight.

The phosphoric component (B) and the silylamine (C) are added to the polydiorganosiloxane (A) in a container capable of heating to the desired temperature and capable of being sealed to allow mixing without contact with the atmosphere, as all moisture must be kept from the mixture so that the reactants react with the hydroxyl groups on the polydiorganosiloxane and not incidental hydroxyl groups allowed into the reaction mixture.

The reaction will take place at room temperature if sufficient time is allowed, for instance, several hundred hours. The reaction will take place in as little as 60 minutes or so if the reaction mixture is heated up to a temperature of 160° C.

After the reaction has proceeded to the desired point, the mixture is subjected to heat and vacuum to remove any volatile products and unreacted ingredients, and then cooled while under vacuum to give a polydiorganosiloxane having a slight change in viscosity and a reduced number of hydroxyl groups on silicon.

The process of this invention can also be used to lower the amount of hydroxyl radicals in polydiorganosiloxane which has been neutralized after polymerization by conventional means, such as with carbon dioxide. In this case, the method comprises (A) heating 100 parts by weight of polydiorganosiloxane to a temperature of from room temperature to 160° C., then (B) adding sufficient acidic or acid producing phosphoric component of the formula

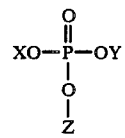

where X, Y, and Z are hydrogen or $SiR_3$, and R is a monovalent hydrocarbon radical or halogenated hydrocarbon radical having 1 to 6 carbon atoms, to give a ratio of alkali metal from the polydiorganosiloxane in (A) to the phosphorus in (B) of from 1:1 to 1:10, and from 0.3 to 3.0 parts by weight of silylamine component of the formula

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms or $R_3Si$— radical, and mixing with the exclusion of atmospheric moisture, then (C) holding at temperature for a sufficient time to allow the removal of the hydroxyl groups, then (D) devolatilizing to remove any volatile products and unreacted ingredients, to yield a polydiorganosiloxane having a slight change in viscosity and a reduced number of hydroxyl groups on silicon.

In this method of reducing hydroxyl active of gums which have already been neutralized with carbon dioxide, the order of addition of the phosphoric component and the silylamine component does appear to make a difference in the result. The concentration of the phosphoric component does have an effect upon whether the resulting gum will develop color upon heating. As the temperature of heating increases, the amount of phosphoric component that gives color decreases. For example, when heated at 200° C., a concentration of phosphate that was 3.5 times the concentration of potassium in the gum developed brown color. At 250° C., color developed at a concentration of phosphate of 2 times the concentration of potassium. The duration of heating is not important, only the temperature. The amount of hydroxyl radicals removed is a function of the concentration of the phosphoric component and the time of reaction. Higher amounts of phosphoric component give faster reaction rates, which give lower hydroxyl amounts for a given time. Longer reaction times give lower amounts of hydroxyl. A time of 1 hour at 160° C. was not sufficient, while a time of 50 hours at room temperature reduced the hydroxyl to zero.

Following the above reasoning, it is preferred that when a gum neutralized with carbon dioxide is to be treated, the ratio of alkali metal to phosphorus is between 1:1 and 1:2 so that color does not develop upon heating of the gum. Using this amount of phosphoric component requires that longer periods of reaction time be used, such as 50 hours, in order to reduce the hydroxyl content to zero. Shorter times of course will lower the hydroxyl content to some extent.

The process of this invention gives a polydiorganosiloxane gum which does not crepe when mixed with reinforcing silica. The gum has an exceptional heat stability when heated in the presence of the oxygen in air. The gum produced by this invention can be used in place of the normally produced polydiorganosiloxane gums to give improved products over those previously available.

The following examples are included for illustrative purposes only and should not be construed as limiting the invention which is properly set forth in the appended claims.

EXAMPLE 1

A polydimethylsiloxane having dimethylvinylsiloxy endblocking and about 0.075 percent vinyl groups along the chain was prepared by adding 2000 g of octamethylcyclotetrasiloxane, 1.5 g of dimethylvinylsiloxy endblocked low molecular weight polydimethylsiloxane fluid, and 3.3 g of methylvinylcyclosiloxane to a dough mixer, heating the mixer to 160° C. while purging with dry nitrogen and mixing. After 30 minutes at temperature, 1.7 g of potassium silanolate (0.05 g potassium) was added to catalyze the polymerization and the mixture was held at temperature with mixing for 9 hours. The polymerization was terminated by injecting 0.15 ml of 85% phosphoric acid (0.175 g of 100 percent phosphoric acid), immediately followed by 8.8 ml (6.75 g) of hexamethyldisilazane. The termination reaction was carried out for 1 hour, by continuing mixing at 160° C., after which the volatile products were removed by placing a vacuum on the mixer contents for ½ hour, then cooling to room temperature under vacuum. The ratio of potassium ion to phosphoric ion was about 1 to 1.1.

The stripped gum was evaluated by measuring the plasticity in accordance with ASTM D 926, the table showing the Williams plasticity number. The activity of the gum, a measure of the amount of hydroxyl groups left was measured in accordance with the procedure discussed above. The heat stability was measured by the weight loss at 250° C. in an air circulating oven after 100 hours.

The properties of the gum are shown in Table 1.

EXAMPLE 2

The procedure of example 1 was repeated, except the polymerization was terminated by first injecting the hexamethyldisilazane and then the phosphoric acid. The properties of the resulting gum are shown in Table 1. This order of treatment resulted in a lower activity and plasticity.

EXAMPLE 3

The procedure of example 2 was repeated, except the amount of 85% phosphoric acid was doubled to 0.30 ml and the termination reaction was carried out for 20 hours at 110° C., then the gum was stripped for ½ hour under vacuum at 160° C. The properties of the resulting gum are shown in Table 1. The increase in acid and reaction time resulted in a lowering of the activity. The ratio of potassium ion to phosphoric ion was about 1 to 2.2.

EXAMPLE 4

The procedure of example 3 was repeated, except the amount of 85% phosphoric acid was again doubled to 0.60 ml and the termination reaction was carried out for 21 hours at 110° C. The properties of the resulting gum are shown in Table 1. The ratio of potassium ion to phosphoric ion was about 1 to 4.4. The increased level of phosphoric acid resulted in a lowering of the activity.

EXAMPLE 5

The procedure of example 4 was carried out with an additional 28 hours at room temperature for the termination reaction, that is the termination reaction consisted of 21 hours at 110° C. plus 28 hours at room temperature, then stripping as above. The properties of the resulting gum are shown in Table 1. The longer reaction time resulted in a lowering of the activity to 0.

EXAMPLE 6

A control sample was prepared by following the procedure of example 1, except the polymerization was terminated by mixing solid carbon dioxide into the gum for 15 minutes, then stripping as above. The properties of the gum are shown in Table 1. This control gum had a high plasticity and activity and was completely evaporated by heating at 250° C. for only 24 hours.

TABLE I

| Example | Williams Plasticity Number | Activity Number | Weight Loss* percent |
|---|---|---|---|
| 1 | 163 | 90 | 6.2 |
| 2 | 140 | 60 | 6.8 |
| 3 | 152 | 38 | 3.4 |
| 4 | 152 | 25 | 5.6 |
| 5 | 152 | 0 | 5.5 |
| 6 | 185 | 60 | 100.0 |

*heated in air circulating oven for 100 hours at 250° C.

EXAMPLE 7

A polydimethylsiloxane gum having a plasticity of 163, an activity of 34, and 40 parts by weight potassium per million parts by weight of gum, was lowered in activity by placing 6800 g of the gum in a dough mixer, purging the mixer with dry nitrogen, and heating to 160° C. with mixing. After reaching temperature, the nitrogen flow was reduced to just maintain a positive pressure. Then 0.5 ml of 85% phosphoric acid (equivalent to 0.7 g of 100 percent phosphoric acid) was added and mixed for 1 minute, then 30 ml of hexamethyldisilazane (23 g) was added and mixing continued for 30 minutes. The treated gum was then stripped by placing a vacuum on the mixer contents for 45 minutes at temperature, and then cooling to room temperature under vacuum. The gum contained 1 potassium per 1.02 parts of phosphoric ion.

A sample of the gum was then washed by placing it on a two roll mill and running distilled water over the milling rubber for a two hour period. The washed gum was then evaluated for properties in the same manner as above, with the results shown in Table II.

EXAMPLE 8

The procedure of example 8 was repeated with a gum having a plasticity of 157, an activity of 46, and 55 parts per million potassium; but using 4.5 ml of 85% phosphoric acid (equivalent to 5.3 g of 100 percent phosphoric acid) and 235 g of hexamethyldisilizane.

After addition of the treating agents, the composition was mixed for 60 minutes at temperature. Then the heat and mixer were turned off and the contents cooled to room temperature. After 17 hours, the mixer was heated to 160° C., placed under vacuum and the contents stripped of volatiles for 45 minutes, then cooled to room temperature under vacuum. The gum contained 1 potassium per 7 phosphorus. A sample of the gum was washed as above and then tested, with the results shown in Table II.

TABLE II

| Example | Williams Plasticity Number | Activity Number | Weight Loss* percent |
|---|---|---|---|
| Original gum | 163 | 34 | 100.0 |
| 7 | 152 | 24 | 8.0 |
| Original gum | 157 | 46 | 100.0 |
| 8 | 152 | 0 | 8.5 |

*heated in an air circulating oven for 100 hours at 250° C.

EXAMPLE 9

The procedure of example 1 was repeated, except that the polymerization was terminated by tris-(trimethylsilyl)phosphate in an amount of 0.048 weight percent and immediately followed by hexamethyldisilizane in an amount of 0.2 weight percent. The termination reaction was carried out for 1 hour by continuing mixing at 110° C., after which the volatile products were removed by placing a vacuum on the mixer contents for ½ hour, then cooling to room temperature under vacuum. The ratio of potassium to phosphorous was about 1 to 3. The activity of the gum was 10 and the Williams plasticity number was 157.

EXAMPLE 10

The procedure of example 9 was repeated, except that the termination reaction was carried out for 24 hours. The resulting gum had an activity of 6 and a Williams plasticity number of 201.

That which is claimed is:

1. A method of producing a polydiorganosiloxane substantially free of hydroxyl groups comprising
    (A) heating 100 parts by weight of polydiorganosiloxane containing alkali metal to a temperature of from room temperature to 160° C., then
    (B) adding sufficient acidic or acid producing phosphoric component of the formula

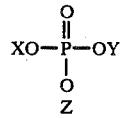

where X, Y, and Z are hydrogen or SiR$_3$, and R is a monovalent hydrocarbon radical or halogenated hydrocarbon radical having 1 to 6 carbon atoms, to give a mole ratio of alkali metal from the polydiorganosiloxane in (A) to the phosphorus in (B) of from 1:1 to 1:10, and from 0.3 to 3.0 parts by weight of silylamine component of the formula

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms or R$_3$Si— radical, and mixing with the exclusion of atmospheric moisture, then
    (C) holding at temperature for a sufficient time to allow the removal of the hydroxyl groups, then
    (D) devolatilizing to remove any volatile products and unreacted ingredients, to yield a polydiorganosiloxane having a slight change in viscosity and a reduced number of hydroxyl groups on silicon.

2. A method of producing a polydiorganosiloxane substantially free of hydroxyl groups comprising
    (A) heating 100 parts by weight of diorganocyclosiloxane to a temperature of from room temperature to 160° C. in the presence of an alkaline polymerization catalyst for a time sufficient to polymerize to the desired molecular weight, to give a polydiorganosiloxane, then
    (B) adding sufficient acidic or acid producing phosphoric component of the formula

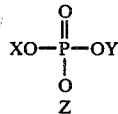

where X, Y, and Z are hydrogen or SiR$_3$, and R is a monovalent hydrocarbon radical or halogenated hydrocarbon radical having 1 to 6 carbon atoms, to give a mole ratio of alkali metal from the polydiorganosiloxane in (A) to the phosphorus in (B) of from 1:1 to 1:10, and from 0.3 to 3.0 parts by weight of silylamine component of the formula

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms or $R_3Si-$ radical, and mixing with the exclusion of atmospheric moisture, then (C) holding at temperature for a sufficient time to allow the removal of the hydroxyl groups, then (D) devolatilizing to remove any volatile products and unreacted ingredients, to yield a polydiorganosiloxane having a slight change in viscosity and a reduced number of hydroxyl groups on silicon.

3. The method of claim 1 in which the mole ratio of alkali metal to phosphorus is between 1:1 and 1:2.

4. The method of claim 3 in which the alkali metal is potassium.

5. The method of claim 4 in which the silylamine component is hexamethyldisilazane.

6. The method of claim 5 in which the phosphoric component is phosphoric acid.

7. The method of claim 6 in which the time in step (C) is sufficient to reduce the hydroxyl level to about 0 activity number.

8. The method of claim 2 in which the ratio of alkali metal to phosphorus is less than 1:4

9. The method of claim 8 in which the alkali metal is potassium.

10. The method of claim 9 in which the silylamine component is hexamethyldisilazane.

11. The method of claim 10 in which the phosphoric component is phosphoric acid.

12. The method of claim 11 in which the hexamethyldisilazane is added before the addition of the phosphoric acid.

13. The method of claim 12 in which the time in step (C) is sufficient to reduce the hydroxyl level to about 0 activity number.

* * * * *